United States Patent
Chiba

[11] Patent Number: 5,229,564
[45] Date of Patent: Jul. 20, 1993

[54] CONTAINER FOR USE IN BAKING SMALL-SIZE COOKIES

[76] Inventor: Machiko Chiba, 26-6, Kawadaira 3-chome, Aoba-ku, Sendai-shi, Miyagi, Japan

[21] Appl. No.: 717,812

[22] Filed: Jun. 19, 1991

[30] Foreign Application Priority Data

Apr. 26, 1991 [JP] Japan .................................. 3-96976

[51] Int. Cl.⁵ .............................................. H05B 9/06
[52] U.S. Cl. ...................... 219/10.55 E; 219/10.55 F; 219/10.55 M; 99/DIG. 14; 426/107; 162/158
[58] Field of Search .................. 219/10.55 E, 10.55 F, 219/10.55 M; 99/DIG. 14, 428, 430; 426/107, 113, 243, 241, 234; 162/158

[56] References Cited

U.S. PATENT DOCUMENTS

| | | | |
|---|---|---|---|
| 1,841,495 | 1/1932 | Mears | 99/430 |
| 2,493,854 | 1/1950 | Brainard | 99/428 |
| 2,515,617 | 7/1950 | Tilford | 99/428 |
| 3,831,507 | 8/1974 | Wheaton | 99/428 |
| 4,039,797 | 8/1977 | Olsen | 219/10.55 E |
| 4,119,824 | 10/1978 | Jeambey | 219/10.55 E |
| 4,183,435 | 1/1980 | Thompson et al. | 219/10.55 E |
| 4,337,116 | 6/1982 | Foster et al. | 219/10.55 E |
| 4,416,906 | 11/1983 | Watkins | 219/10.55 E |
| 4,486,640 | 12/1984 | Bowen et al. | 219/10.55 E |
| 5,062,356 | 11/1991 | Frankowski | 99/428 |

*Primary Examiner*—Bruce A. Reynolds
*Assistant Examiner*—Tu Hoang
*Attorney, Agent, or Firm*—Wenderoth, Lind & Ponack

[57] ABSTRACT

Recesses are formed in the flat portion of a plate at a distance from the center thereof. Legs longer than the depth of the recesses are provided around the recesses. Both the plate and the legs are part of a one-piece member constituting a baking container. Dough is placed in each recess and the container is placed in the heating chamber of a microwave oven. In this state, the dough is heated with microwaves. Since the recesses are located at portions where microwaves are irradiated uniformly, the dough can be baked uniformly. Also, since the legs serve to support the recesses above the bottom of the cooking chamber of the oven, the heat generated at the bottom of the recesses can be effectively dissipated, thus preventing the dough from being locally heated strongly at these portions. This prevents hardening and discoloration of the dough at its bottom face.

4 Claims, 5 Drawing Sheets

CONTAINER FOR USE IN BAKING SMALL-SIZE COOKIES

BACKGROUND OF THE INVENTION

This invention relates to a container for use in baking small-size cookies such as madeleine in a microwave oven.

Since it has been thought that cookies and other confectionery can be easily cooked with a microwave oven, no attempt has been made to develop a container for use in baking small-size cookies such as madeleine in a microwave oven. Heretofore, in baking such small-sized cookies, dough placed in a suitable container was simply put in a microwave oven for microwave irradiation.

But a microwave oven has a peculiar characteristic in that the heating temperature in the heating chamber is lower, e.g. 30° C. lower, at the center thereof than at its peripheral part. Thus, if dough in a container is placed offhandedly, its center and peripheral part will be baked to different degrees. Such cookies will not taste good.

When heating in a microwave oven, microwave penetrate into the food from every direction to the depth of 9-3.8 cm, oscillating the molecules of the food within their reach to heat the food. The heat thus generated is transmitted gradually to the center, so that the entire part of the food is heated and cooked. While being heated, the water content of the food migrates gradually to the peripheral part (including the bottom of the container), together with the fat and sugar contents. Since water and fat tend to absorb microwaves more easily, they are heated strongly. Thus, if the container is in contact at its bottom with the inner surface of the heating chamber, the heat generated at the bottom part cannot be dissipated effectively. This will cause the food to be heated more strongly at the bottom. The food thus develops a brownish or hardened bottom part. This worsens its taste.

The water which has migrated to the surface of the food evaporates into the surrounding air. When heating in a microwave oven, cooking conditions are delicately influenced by the water content in the food. Since the amount of microwave irradiation differs between the center and periphery of the food, the amount of water evaporation cannot be kept uniform over the entire portion of the food. This also worsens the taste of the food.

SUMMARY OF THE INVENTION

An object of this invention is to provide a container for use in a microwave oven which permits uniform heating and heat dissipation of the dough over the entire portion thereof.

In accordance with the present invention, there is provided a container for use in baking small confectioneries in a microwave oven, the container comprising a one-piece plate-like member having a plate including a flat portion and concave portions defining a plurality of recesses for accommodating dough located circumferentially at a predetermined distance from the center of the plate and at regular intervals from one another, the plate-like member further including at least one leg having such a length that the concave portions, i.e. the recesses, will be supported above a plane on which the container is placed.

The length is determined based on the distribution of microwaves of the oven used so that the recesses are not located in the central part of the heating chamber where microwaves are weak. The intervals should be determined according to the number and size of the recesses.

The container according to this invention is placed in the heating chamber of a microwave oven together with cookie dough so as to be concentric with the chamber and to allow the dough to be baked with microwaves.

Since the recesses are away from the center of the heating chamber at a location where microwaves are distributed uniformly, the dough can be baked uniformly. Also, since the recesses are spaced apart from the bottom surface of the heating chamber, the heat generated at the bottom can be effectively dissipated. This serves to reduce the difference in the degree of heat dissipation over the entire part of the cookie dough.

Thus, according to this invention, cookies can be baked uniformly. Such cookies taste good.

BRIEF DESCRIPTION OF THE DRAWINGS

Other features and objects of the present invention will become apparent from the following description taken with reference to the accompanying drawings, in which.

DETAILED DESCRIPTION OF THE PREFERRED EMBODIMENTS

Figure 1:
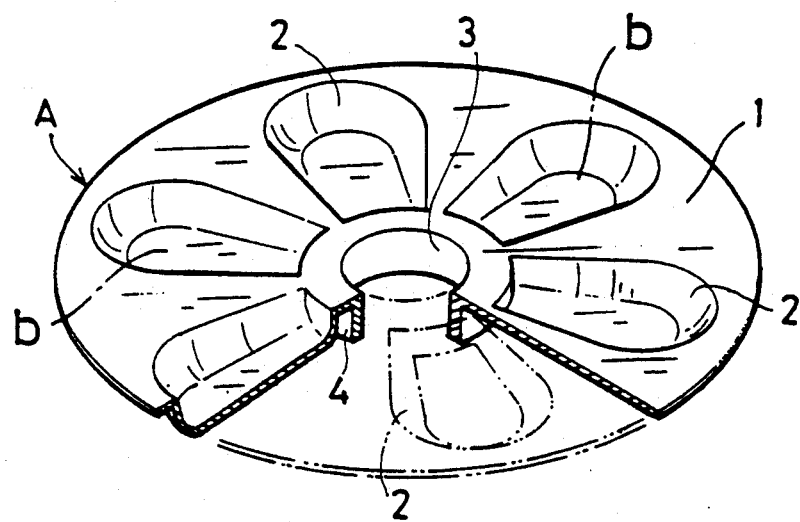
FIG. 1 is a perspective view of the first embodiment of a baking container according to the present invention.
Figure 10:
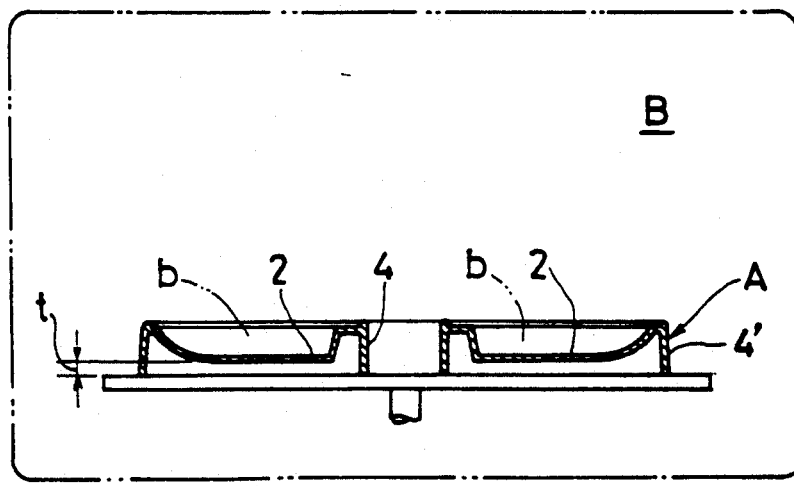
FIG. 10 is a schematic diagram illustrating how cookies are baked in a microwave oven using the container of the present invention.

FIG. 1 shows the first embodiment which is a formed article made of heat-resistant plastic such as polypropylene. A one-piece plate-like member has a plate 1 including a flat portion of a diameter of 21.5 cm, unbroken concave portions at the periphery of the plate which define six recesses 2 at equal angular intervals, and a through-hole 3 in the center thereof. The one-piece plate-like member also has a leg 4 formed by a peripheral wall extending around and defining the hole 3. Each recess 2 should have a capability that is great enough to receive a large spoonful of dough b. When the container A is placed in the heating chamber B of a microwave oven, the concave portions of the plate 1 defining the bottoms of the recesses 2 are located off the bottom of the chamber B (by a distance t), as shown in FIG. 10.

Figure 2:
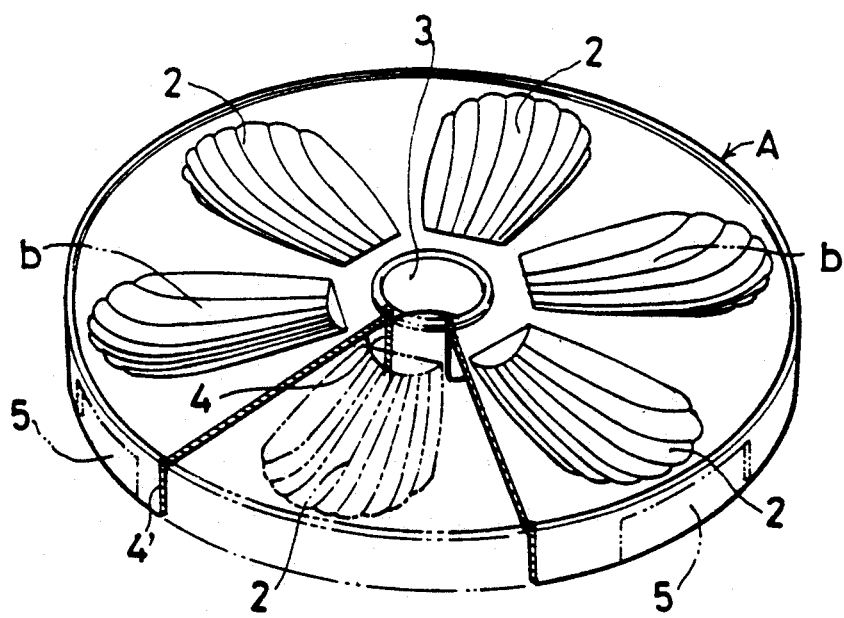
FIG. 2 is a perspective view of a second embodiment of the container.
Figure 3:
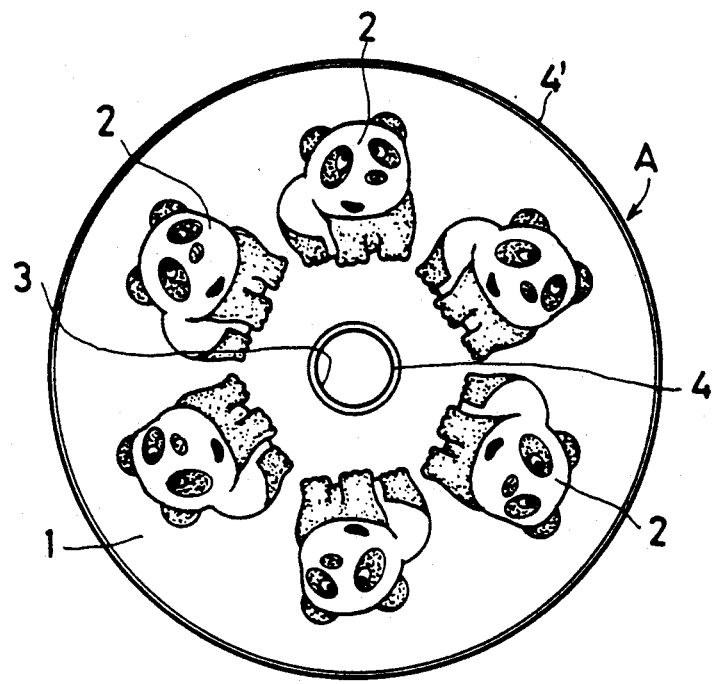
FIGS. 3 to 9 are plan views of third to ninth embodiments of the container.
Figure 4:
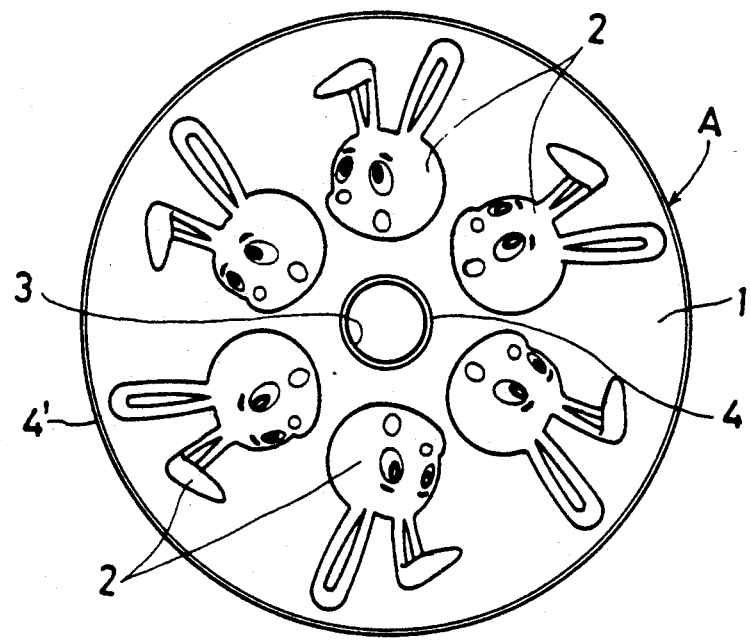
Figure 5:
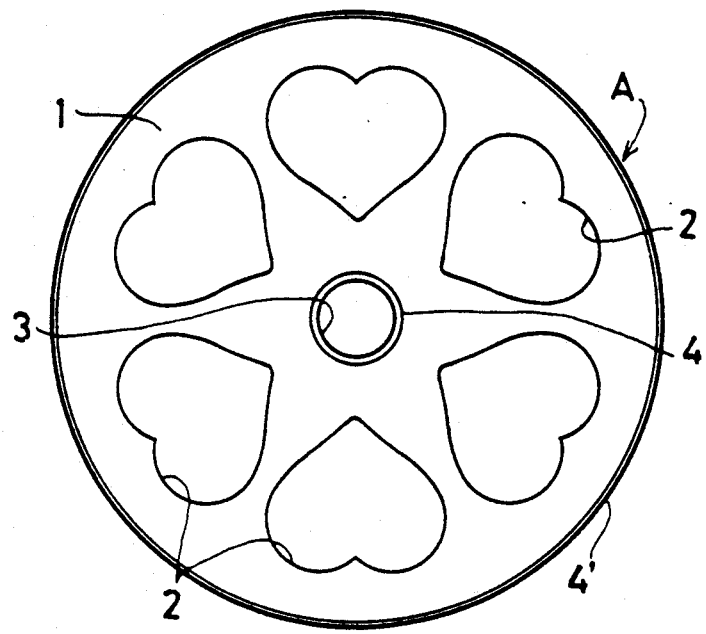
Figure 6:
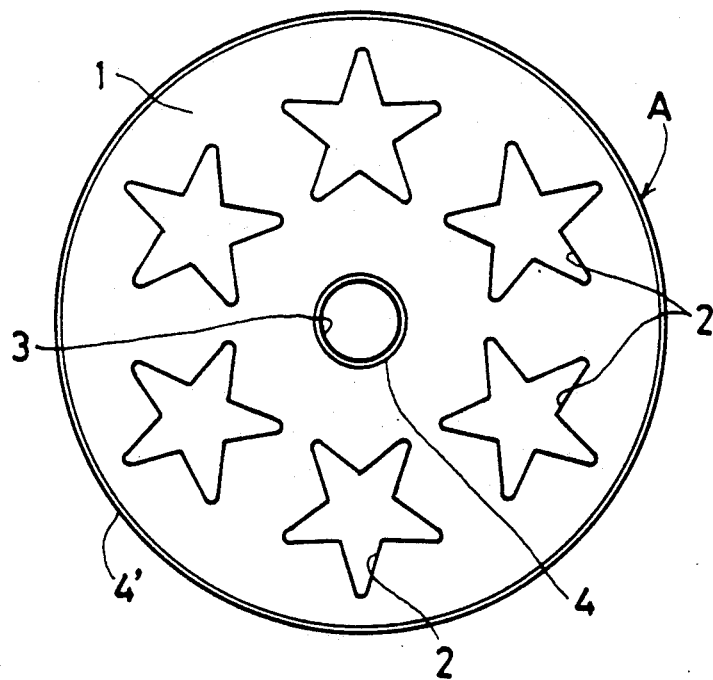
Figure 7:
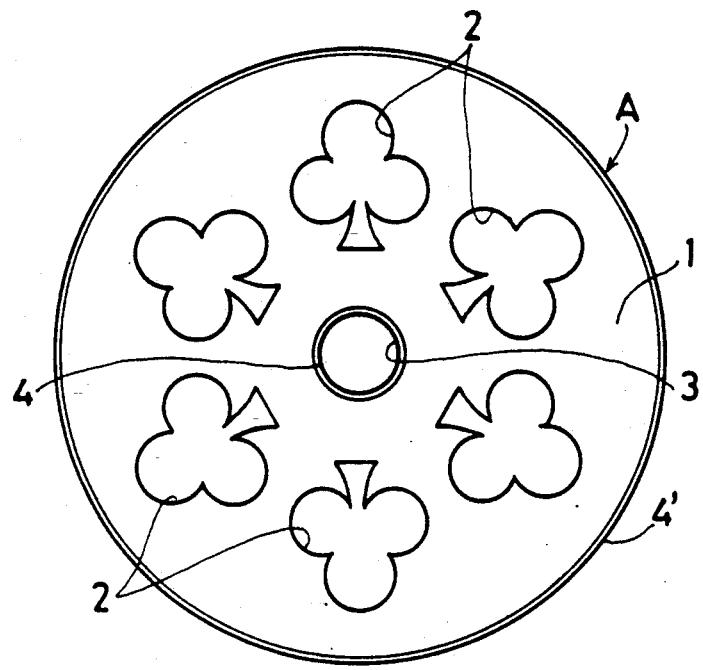
Figure 8:
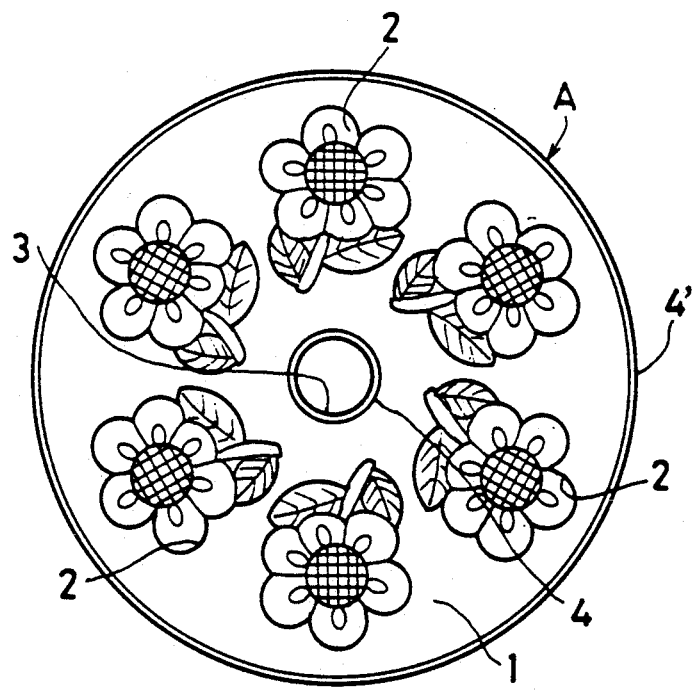
Figure 9:
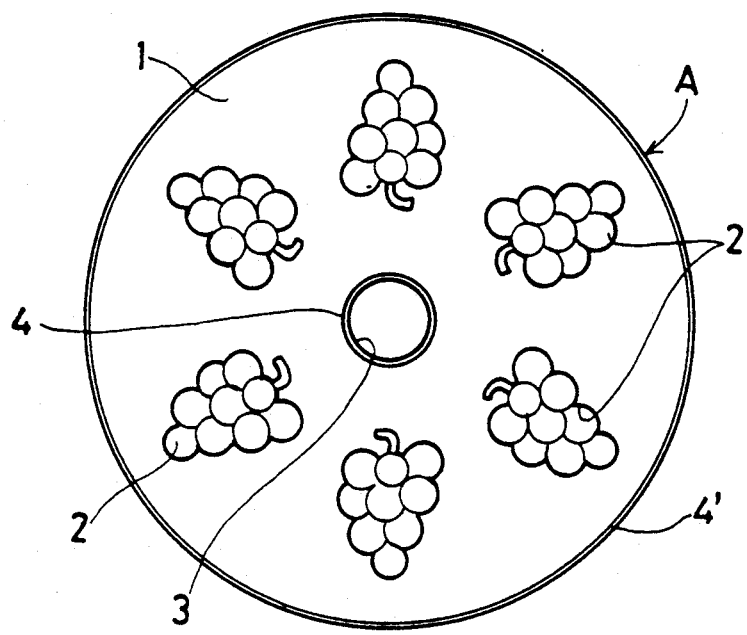

In the second embodiment shown in FIG. 2, the recesses 2 have a shell-like shape. They may be shaped in any other way. For example, they may be in the shape of pandas, rabbits or bears as shown in FIGS. 3 and 4, hearts, clubs, diamonds or spades as shown in FIGS. 5-7, or flowers, fruits or vegetables as shown in FIGS. 8 and 9. Also, holes or cutouts 5 may be formed in the legs 4 and 4' to improve heat dissipation.

The one-piece plate-like member may be made not from plastic but from any other material which can be put in a microwave oven such as heat-resistant glass, ceramics and paper. The shapes of the periphery of the flat portion of the plate 1 and of the hole 3 are not limited to those of a circle but may be those of a regular hexagon or any other regular polygon as long as microwaves can be irradiated uniformly.

Next, how to bake madeleine with the container A will be explained.

The following ingredients were prepared.
flour (weak): 170 g
baking powder: two small spoonfuls
salt: a little
margarine: 170 g
granulated sugar: 170 g
eggs: three
milk: 600 cc The flour and baking power were shifted three times from the height of 30 cm. The margarine has to be melted sufficiently by heating in a microwave oven. By sifting from a high point, air is mixed into the flour, allowing it to rise (ferment) quickly.

Madeleine was made from these ingredients in the following manner.

i) The eggs were put in a completely dried bowl and whipped with the bowl dipped in hot water. Then, after taking the bowl out of hot water, the eggs were whipped further until the bowl cooled. An electric hand mixer may be used for whipping.

ii) The other ingredients such as flour and margarine were mixed into the thus whipped eggs and kneaded well to form dough b for madeleine.

The dough b was put in the recesses 2 in the container of each embodiment. This container A was placed in a microwave oven and heated for one and half minutes at 500-800 watts. The madeleine thus made tasted good.

The container A can be used for baking not only madeleine but other cookies and pastry.

What is claimed is:

1. A container for use in baking small confectioneries in a microwave oven, said container consisting of a one-piece plate-like member having a plate and at least one leg extending therefrom, said plate having a hole extending through a center thereof, said plate including a flat portion and unbroken concave portions contiguous to said flat portion thereby defining a plurality of recesses in the plate having closed bottoms whereby the concave portions are capable o directly supporting respective portions of raw dough thereon, said recesses being spaced the same distance from the center of the plate and at regular intervals from one another, said at least one leg including a leg extending around and defining said hole, said at least one leg terminating at a location below the concave portions thereby being capable of supporting bottoms of said concave portions above a flat surface on which the container is rested, said one-piece plate-like member forming an open space below said plate as bounded in part by said concave portions whereby heat will readily dissipate from said concave portions defining said recesses.

2. A container as claimed in claim 1, wherein said at least one leg further includes a leg extending from the periphery of said plate.

3. A container as claimed in claim 1, wherein said at least one leg has holes or cutouts therethrough.

4. A container as claimed in claim 2, wherein each of said legs has holes or cutouts therethrough.

* * * * *